United States Patent
Montemurro et al.

(10) Patent No.: US 11,956,236 B2
(45) Date of Patent: Apr. 9, 2024

(54) SYSTEM AND METHOD FOR TRACKING PRIVACY POLICY IN ACCESS NETWORKS

(71) Applicants: Michael Montemurro, Toronto (CA); Stephen McCann, Rownhams (GB); Sheng Sun, Ottawa (CA); Kwok Shum Au, Ottawa (CA)

(72) Inventors: Michael Montemurro, Toronto (CA); Stephen McCann, Rownhams (GB); Sheng Sun, Ottawa (CA); Kwok Shum Au, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 477 days.

(21) Appl. No.: 17/199,101

(22) Filed: Mar. 11, 2021

(65) Prior Publication Data
US 2022/0294787 A1    Sep. 15, 2022

(51) Int. Cl.
*H04L 9/40*    (2022.01)

(52) U.S. Cl.
CPC ...... *H04L 63/0892* (2013.01); *H04L 63/0254* (2013.01)

(58) Field of Classification Search
CPC .......... H01L 63/0892; H01L 63/0254
See application file for complete search history.

(56) References Cited

U.S. PATENT DOCUMENTS

| | | | |
|---|---|---|---|
| 8,660,536 B1 * | 2/2014 | Pogue | H04L 63/10 455/411 |
| 2011/0258679 A1 | 10/2011 | Kaplinger et al. | |

(Continued)

FOREIGN PATENT DOCUMENTS

| | | | |
|---|---|---|---|
| CN | 103973749 A | 8/2014 | |
| CN | 106656936 A | 5/2017 | |
| WO | WO-2010054354 A2 * | 5/2010 | ............. H04L 12/14 |

OTHER PUBLICATIONS

IEEE 802.11-2020—IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Sub-clauses 4.3.8, 4.5.4.5, 4.5.4.10, 9.4.2.24, 9.4.5, 9.4.5.20, 9.4.5.22, 9.4.5.23, 9.4.5.29, 11.22.3.3, 12, 12.2.4, 12.2.5, 12.2.6, and 12.2.10.

*Primary Examiner* — Brian F Shaw

(57) ABSTRACT

Systems and methods for tracking the privacy policy of an electronic device in a network having a privacy policy server and an authentication server are provided. In one aspect a privacy policy server receives a connection request from the electronic device, queries an authentication server for the device's privacy policy acceptance state. If the device had not accepted the network's privacy policy, the privacy policy server sends a URL to the device so the device may accept or reject the policy. The authentication server locates a network session identifier representing the device's connection with the network and response to the policy server indicating the device's current privacy policy acceptance state if applicable. Advantageously, a network session identifier can track a device's privacy policy acceptance state when the device reconnects with the network. The systems and methods are applicable in wireless networks, such as 802.11.

15 Claims, 11 Drawing Sheets

(56) References Cited

U.S. PATENT DOCUMENTS

| | | |
|---|---|---|
| 2017/0154191 A1 | 6/2017 | Hu et al. |
| 2017/0310710 A1 | 10/2017 | Hu et al. |
| 2018/0351958 A1* | 12/2018 | Sakurai ................. H04L 63/102 |
| 2020/0112589 A1* | 4/2020 | Chauhan ............... H04W 12/02 |

* cited by examiner

| Attribute Name | Attribute Type | Description |
|---|---|---|
| privacyRequired | Bool | always set to TRUE when present |
| privacyPolicyVersion | Int | set to the version of the policy |
| privacyPolicyDate | Int | a timestamp for the data the policy was invoked |

FIG. 9A

| Attribute Name | Attribute Type | Description |
|---|---|---|
| privacyPolicyAccepted | Bool | always set to TRUE when present |
| privacyPolicyVersion | Int | set to the version of the policy |
| privacyPolicyDate | Int | Description |

SYSTEM AND METHOD FOR TRACKING PRIVACY POLICY IN ACCESS NETWORKS

FIELD

This disclosure relates generally to access networks and more specifically to methods and systems for tracking privacy policy in access networks.

BACKGROUND

Data privacy and protection is increasingly of concern in wireless communications. The European Commission has passed a General Data Protection Regulation (GDPR) which is a new set of rules designed to give EU citizens more control over their personal data. According to the GDPR, organizations must provide people with a privacy notice that satisfies a number of conditions. The privacy notice must be written in a concise, transparent, intelligible, and easily accessible form. The privacy notice must also be delivered in a timely manner and provided free of charge. GDPR provides requirements as to what information an organization must share in a privacy notice. These requirements vary depending on whether the organization collects its data directly or receives it as a third party.

Currently some wireless networks do not have full support for providing and tracking of a privacy policy between a network and an electronic device (ED) connected to the network.

Typically, the state of connectivity between an ED and a network, is associated with a device address of the ED when the ED joins the network. Accordingly, a network may track an ED's acceptance/rejection of a privacy policy by associated the ED's acceptance with its device address. If, however, the device address of the ED changes, the state of the privacy policy acceptance cannot be maintained by the network. One example of the device address is a Medium Access Control (MAC) address. MAC addresses are defined in the IEEE 802-2014 and IEEE 802C standards. MAC addresses contain two bits that are not used to identify a device. One of these two bits is used to signify a MAC address that is used to transmit broadcast frames on an IEEE 802 network. The other one of these two bits designates, if it is set, a locally-administered MAC address, which is not globally unique. If, however, the bit is not set, then the MAC address is globally unique. A globally unique MAC address is assigned to an ED and is considered a device address. Traditionally, a globally-unique MAC address is used to identify a device on IEEE 802 networks. However, in order to address new privacy concerns, the MAC address of a device may be randomized by setting the locally-administered bit and generating a 46-bit random number. This, however, poses a challenge for a network operator to track and maintain a device's state with respect to a privacy policy for example.

Some EDs may be provided with a display thus permitting a privacy policy to be displayed and acceptance/rejection thereof be received from a user via a user interface. However, other EDs, such as Internet of Things (IoT) devices may not allow user interaction so alternate ways for privacy policy acceptance/rejection are needed.

There is a need for supporting privacy policy on wireless devices. Particularly, devices which use a random or a changing device address need a way for the network to track their privacy policy preferences. Devices which do not contain user interaction peripherals, such as IoT devices, also need ways for setting and tracking privacy policy in a wireless network.

SUMMARY

The present disclosure provides methods and system for tracking a privacy policy in a network.

In one aspect of the present disclosure there is provided a method at a privacy policy server connected within a network. The method includes receiving a connection request from an electronic device connected within the network and querying an authentication server for a privacy policy acceptance state of the electronic device. The method further includes in response to determining that the privacy policy acceptance state indicates that the electronic device has not accepted a privacy policy of the network, sending a privacy policy universal resource locator (URL) to the electronic device; receiving a response to the privacy policy, from the electronic device, via the privacy policy URL; and forwarding the response to the privacy policy, to the authentication server, for controlling a gateway based on the response to the privacy policy.

In some examples of the preceding aspect, the method further includes receiving, from the authentication server, an acknowledgment that the response to the privacy policy which indicates that an acceptance of the privacy policy of the network has been provided to the authentication server and that the electronic device has been allowed full access to the network.

In another aspect of the present disclosure, there is provided a privacy policy server including a processing unit coupled to a memory, the memory storing instructions that, when executed by the processing unit, cause the policy server to receive a connection request from an electronic device connected within the network, and query an authentication server for a privacy policy acceptance state of the electronic device based on a device address of the electronic device. In in response to determining that the privacy policy acceptance state indicates that the electronic device has not accepted a privacy policy of the network, the instructions further configure the privacy policy server to send a privacy policy universal resource locator (URL) to the electronic device; receive a response to the privacy policy, from the electronic device, via the privacy policy URL; and forward the response to the privacy policy, to the authentication server, for controlling a gateway based on the response to the privacy policy.

In some examples of the preceding aspect, the instructions further cause the policy server to receive, from the authentication server, an acknowledgment that the response to the privacy policy which indicates that an acceptance of the privacy policy of the network has been provided to the authentication server and that the electronic device has been allowed full access to the network.

In some examples of any of the preceding two aspects, controlling the gateway comprises allowing the electronic device to have full access to the network if the response to the privacy policy indicates acceptance of the privacy policy of the network by the electronic device.

In other examples of any of the preceding two aspects, controlling the gateway comprises denying the electronic device full access to the network if the response to the privacy policy indicates rejection of the privacy policy of the network by the electronic device.

In yet another aspect of the present disclosure, there is provided a method at an authentication server connected within a network. The method includes receiving, from a privacy policy server, a query for a device address of an electronic device; locating a network session identifier associated with the device address; searching for a device privacy state tuple containing the network session identifier; and in response to locating a device privacy state tuple containing the network session identifier, sending, to the privacy policy server, a result to the query, the result indicating a privacy policy acceptance state in the device privacy state tuple.

In some examples of the preceding aspect, the method further includes configuring a gateway to allow the electronic device to have full access to the network in response to determining that the privacy policy acceptance state indicates acceptance of a privacy policy of the network.

In some examples of the preceding aspect, the method further includes in response to not locating the device privacy state tuple containing the network session identifier, creating another device privacy state tuple containing the device address, the network session identifier and a value for the privacy policy acceptance state indicating that the electronic device has not accepted a privacy policy of the network.

In some examples of the preceding aspect, the method further includes receiving, from the privacy policy server, a privacy policy response indicating acceptance or rejection of a privacy policy of the network by the electronic device. The method may further include in response to determining that the privacy policy response indicates an acceptance of the privacy policy of the network by the electronic device, configuring a gateway to allow the electronic device to have full access to the network. The method may further include sending a privacy policy state acknowledgement to the privacy policy server.

In a further aspect of the present disclosure, there is provided a non-transitory computer-readable medium storing instructions that when executed by the processing unit of an authentication server, cause the authentication server to receive, from a privacy policy server, a query for a device address of an electronic device; locate a network session identifier associated with the device address; and search for a device privacy state tuple containing the network session identifier. The instructions further cause the authentication server to in response to locating a device privacy state tuple containing the network session identifier, send, to the privacy policy server, a result to the query, the result indicating a privacy policy acceptance state in the device privacy state tuple.

In some examples of the preceding aspect, the instructions further cause the authentication server to in response to determining that the privacy policy acceptance state indicates acceptance of a privacy policy of the network, configure a gateway to allow the electronic device to have full access to the network.

In some examples of the preceding aspect, the instructions further cause the authentication server to in response to not locating the device privacy state tuple containing the network session identifier, create another device privacy state tuple containing the device address, the network session identifier and a value for the privacy policy acceptance state indicating that the electronic device has not accepted a privacy policy of the network.

In some examples of the preceding aspect, the instructions further cause the authentication server to receive, from the privacy policy server, a privacy policy response indicating acceptance or rejection of a privacy policy of the network by the electronic device. In one example, the instructions may further cause the authentication server to in response to determining that the privacy policy response indicates an acceptance of the privacy policy of the network by the electronic device, configure a gateway to allow the electronic device to have full access to the network. In another example, the instructions may further cause the authentication server to send a privacy policy state acknowledgement to the privacy policy server.

Advantageously, an electronic device may be provided with a network's privacy policy and a URL through which it can accept or reject the network's privacy policy. Tracking an electronic device's connection with a network by a network session identifier overcomes issues which arise when the electronic device reconnects with the network with a different or a random device address. As the electronic device is able to connect with a previous network session identifier, the device's acceptance or rejection of the network's privacy policy can be reused averting the need to ask for privacy policy acceptance on each reconnection.

BRIEF DESCRIPTION OF THE DRAWINGS

Reference will now be made, by way of example, to the accompanying drawings which show example embodiments of the present application, and in which:

FIG. 9A illustrates an example of additional station (STA) Connector attributes for supporting privacy policy in the Device Provisioning Protocol (DPP);

FIG. 9B illustrates an example of additional access point (AP) Connector attributes for supporting privacy policy in the DPP;

DESCRIPTION OF EXAMPLE EMBODIMENTS

Figure 1:
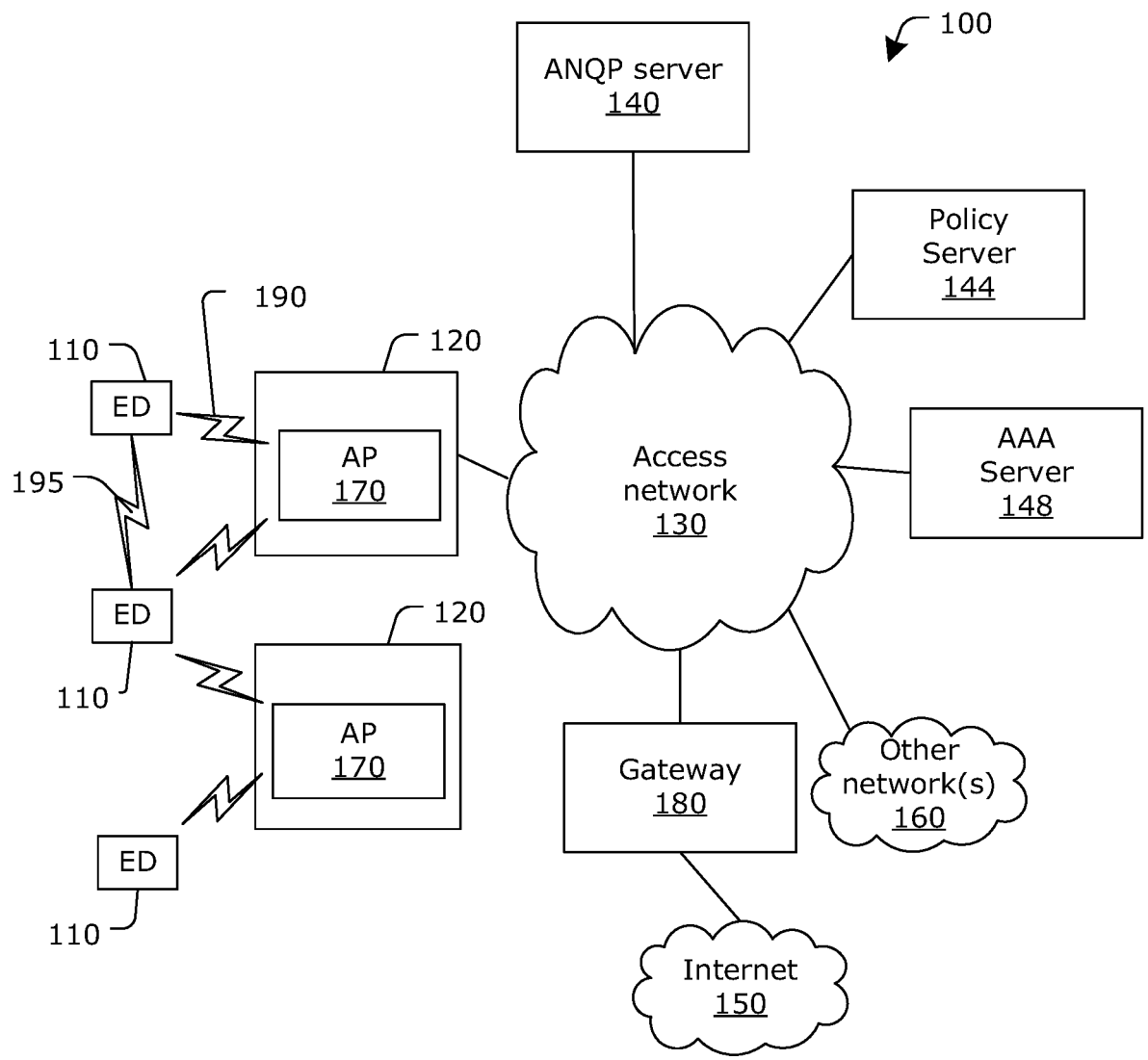
FIG. 1 is a schematic diagram of an example communication system suitable for implementing examples described herein.

Compliance with privacy requirements is an ongoing concern. Many privacy regulations have been enacted with respect to data privacy. In the present disclosure, data privacy is defined as ensuring that collection, storage and usage of a user's data is in accordance with the user's knowledge and consent. Many solutions that have been designed, in compliance with IEEE 802.11 standards, are concerned with data protection, which may be defined as how to prevent unauthorized access to a user's data. However, there is also a need to provide a technical solution that enables requesting and receiving user consent for authorizing access by an electronic device to a wireless network.

In this disclosure, the term electronic device (ED) refers to a user device which is capable of communicating with a wireless network. One example of an ED is an 802.11 station (STA).

For an ED, such as an 802.11 STA, this disclosure proposes methods and systems to minimize both the personal identifiable information (PII) and/or the personal correlated information (PCI) exposed to other parties. An ED needs to receive the privacy policy of a network it joins in order to determine what information may be collected therefrom, what the collected information is used for, and how long the collected information is retained by the network. In response to determining what the privacy policy entails, the ED may accept or reject the privacy policy. If the ED rejects the privacy policy, then the ED cannot be allowed full access to the network. If the ED accepts the privacy policy, the ED can be allowed full access to the network.

For a network, such as an 802.11 network, this disclosure proposes methods and systems for communicating the privacy policy of the network to an ED, such as an 802.11 STA. Additionally, the present disclosure proposes methods and systems for ensuring, by a network, that the ED has acknowledged acceptance of the privacy policy when the ED connects to the network. Furthermore, the present disclosure provides methods and systems which address the challenges of tracking a device's response to a network's privacy policy when the device reconnects to the network with a different device (e.g. MAC) address. This disclosure also provides methods and systems for accepting or rejecting a privacy policy in IoT devices having no user interaction.

The methods and systems for privacy tracking presented in this disclosure introduce, at a high level, a procedure performed by various network components and the ED.

A network advertises a privacy policy capability flag indicating whether it supports a privacy policy. An ED considering connecting to the network receives the privacy policy capability flag before connecting to the network. The privacy policy capability flag advertised may be as simple as a bit indicating whether privacy policy is supported by the network. In some example embodiments, the privacy policy capability flag is accompanied by meta-data that provides a simple level of information about the privacy policy. For example, the meta-data may indicate whether the privacy policy conforms to GDPR. As another example, the meta-data advertised by the network may include a policy Universal Resource Locator (URL), i.e. a web address, which points to more detailed information about the privacy policy on the network. In some examples, for an 802.11 network, the network may advertise the privacy policy capability flag and/or the meta-data in beacon frames broadcast by the network's access points (APs). In other examples, an 802.11 network may provide the privacy policy capability flag and meta-data in a probe response frame sent by the AP in response to a probe request frame sent to the AP by a STA.

In some example embodiments, an ED detects a network by discovery. An ED discovers a network by scanning a plurality of frequency bands. The scanning may result in a plurality of networks being discovered. The ED then selects a network based on pre-configured criteria or user choice. For example, a user may observe the presence of a plurality of 802.11 networks in the vicinity and then selects one network for connection. In other example embodiments, an ED may send a request frame to a particular network and await a response frame from that network. For example, for 802.11 networks, a STA may send a probe request frame to a particular network specified by a Service Set Identifier (SSID). If an AP belonging to the network having that SSID receives the probe request frame, it may respond with a probe response frame.

Before connecting to a particular network, the ED receives the privacy policy capability flag from that network. If the privacy policy capability flag indicates that no privacy policy support is available on the network, the ED may not proceed further if the ED has been configured to only connect to networks with privacy policy capability. Alternatively, if the privacy policy capability flag indicates that privacy policy support is available on the network, then the ED may either connect or request the full privacy policy from the network. The network receives a request for the privacy policy from the ED and provides the privacy policy to the ED as will be described in more detail below.

The ED may acknowledge receipt of the privacy policy and then provide an indication to the network indicating the ED's response to the privacy policy. The ED may accept or reject the privacy policy. If the ED rejects the privacy policy, full connection with the network is disallowed, for example by a gateway. Conversely, if the ED accepts the privacy policy, full connection with the network is allowed. The ED may explicitly accept the privacy policy by providing a user of the ED with a user interface to provide an indication of acceptance of the privacy policy. Alternatively, the ED may implicitly accept the privacy policy using an automated or predefined consent method.

Figure 2:
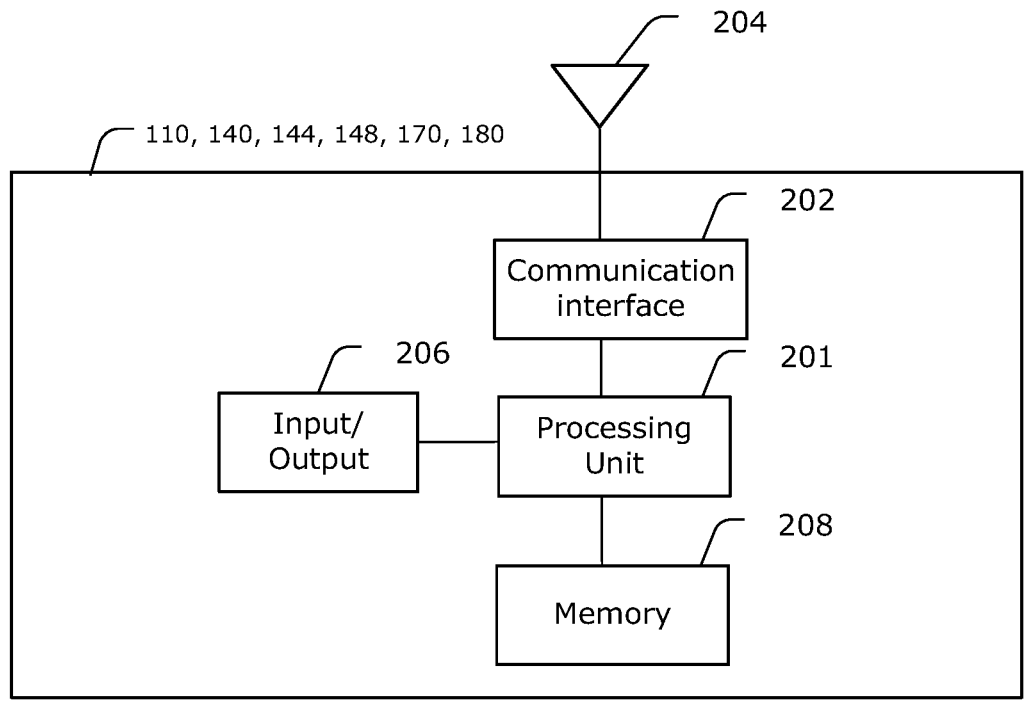
FIGS. 2 and 3 are block diagrams showing example apparatuses that may be suitable for implementing examples described herein.
Figure 3:
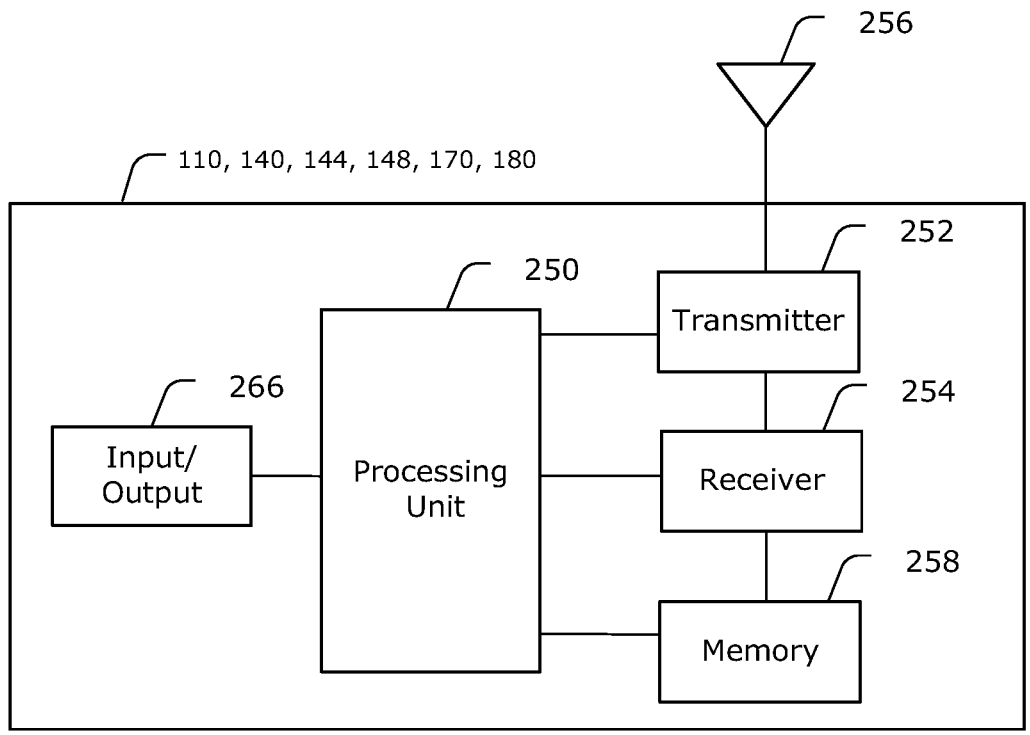

To assist in understanding the present disclosure, FIGS. 1-3 are first described. FIGS. 1-3 provide examples of the network, system and apparatuses that may be used to implement examples described in the present disclosure.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated wirelessly (e.g., via broadcast, narrowcast, user device to user device, etc.) among entities of the wireless system 100, for example using 802.11 communications. The wireless system 100 may operate by sharing resources such as bandwidth. The wireless system 100 may be suitable for wireless communications, using 5G technology and/or later generation wireless technology. In some examples, the wireless system 100 may also accommodate some legacy wireless technology (e.g., 3G or 4G wireless technology).

In the example shown, the wireless system 100 includes EDs 110, local area networks (LANs) 120, an access network 130, an access network query protocol (ANQP) server 140, a privacy policy server 144, a AAA (authentication, authorization and accounting) server ("authentication server") 148, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, an internet of things (IoT) device, or a consumer electronics device, among other possibilities. Future generation EDs 110 may be referred to using other terms.

In FIG. 1, the LANs 120 include access points (APs) 170. Although FIG. 1 shows each LAN 120 including a single respective AP 170, it should be understood that any given LAN 120 may include more than one AP 170, and any given LAN 120 may also include other controllers, relay nodes, elements, and/or devices. Each AP 170 is configured to wirelessly interface with one or more of the EDs 110 to enable access to any other AP 170, the access network 130, the ANQP server 140, the privacy policy server 144, the AAA server 148, the internet 150, and/or the other networks 160. In some examples, instead of a LAN 120, the AP 170 may be part of a personal area network (PAN), regional access network (RAN), or wide area network (WAN), among other possibilities. There may be a variety of different local/regional/wide area networks (generally represented by LANs 120 in the example of FIG. 1) in the wireless system 100, with access provided by different types of APs 170. For example, depending on context, the APs 170 may also be referred to as (or may include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, a base station (BS), or a wireless router, among other possibilities. In some examples, the LAN 120 may be a Next Generation (NG) network, and the AP 170 may be referred to as a NG-RAN node. In such cases, the AP 170 may be a gNB or a NG-eNB (which is an eNB that is connected to the NG core network via a NG interface). Future generation APs 170 may be referred to using other terms. Any ED 110 may be alternatively or additionally configured to interface, access, or communicate directly with any other AP 170, the internet 150, the access network 130, the ANQP server 140, the privacy policy server 144, the AAA server 148, the other networks 160, or any combination of the preceding.

The EDs 110 and APs 170 are examples of communication equipment that can be used to implement some or all of the functionality and/or embodiments described herein. Any AP 170 may be a single element, as shown, or multiple elements, distributed in the corresponding LAN 120, or otherwise. Each AP 170 transmits and/or receives wireless signals within a particular geographic region or area, sometimes referred to as a "cell" or "coverage area". A cell may be further divided into cell sectors, and an AP 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of LANs 120 shown is exemplary only. Any number of LANs 120 may be contemplated when devising the wireless system 100.

The APs 170 communicate with one or more of the EDs 110 over one or more Uu wireless interfaces 190 (e.g., via radio frequency (RF), microwave, infrared (IR), etc.). The Uu wireless interface 190 may also be referred to as a Uu link, Uu connection, ED-AP link/connection/interface, or ED-network link/connection/interface, for example. The EDs 110 may also communicate directly with one another (i.e., without involving the AP 170) via one or more sidelink (SL) wireless interfaces 195. The SL interface may also be referred to as a SL connection, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The LANs 120 are in communication with the access network 130 to provide the EDs 110 with various services such as voice, data, and other services. The LANs 120 and/or the access network 130 may be in direct or indirect communication with one or more other LANs (not shown), which may or may not be directly served by access network 130, and may or may not employ the same radio access technology. The gateway 180 may provide access between (i) the LANs 120 or EDs 110 or both, and (ii) other networks (such as the internet 150, and the other networks 160). The gateway 180 may be configured, for example by the AAA server and/or the policy server to allow or deny full access to the network including access to the internet 150 for any one of the EDs 110 based on a number of factors, including failed authentication or the ED's rejection of a privacy policy, as will be described in more detail below.

In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. The internet 150 may include a network of computers and subnets (intranets) or both, and incorporate protocols, such as Internet Protocol (IP), Transmission Control Protocol (TCP), or User Datagram Protocol (UDP). The EDs 110 may be multimode devices capable of operation according to multiple radio access technologies, and incorporate multiple transceivers necessary to support such.

In the example of FIG. 1 an access network query protocol (ANQP) server 140 is connected to the access network. ANQP is a query and response protocol that enables an ED 110 to request (and receive in response) information about services available at a given AP 170 and LAN 120 (typically by querying the AP 170 at that LAN 120). Some operations that involve the ANQP server 140 are defined under the IEEE 802.11-2020 standard. The ANQP server 140 may perform operations (e.g., as discussed herein) to enable an ED 110 to be informed of policy at a given LAN 120, for example.

In some examples, the ANQP server 140 may be implemented at an AP 170 of the LAN 120. Although described as a singular ANQP server 140, in some examples the ANQP server 140 may be implemented in a distributed manner (e.g., being a virtual machine distributed over two or more physical servers). In the present disclosure, reference may be made to the ANQP server 140 in the access network 130 for simplicity, however it should be understood that the ANQP server 140 may be implemented in various different ways.

In the example of FIG. 1, the privacy policy server 144 stores and provides privacy policy information, including a privacy policy universal resource locator (URL). The AAA server 148 provides authentication for the ED 110, and also instructs the gateway 180 to allow or deny access to the internet 150 for the ED 110 based on a number of factors including the acceptance of the privacy policy of the wireless system 100.

FIGS. 2 and 3 illustrate example apparatuses that may implement the methods and teachings according to this disclosure. FIGS. 2 and 3 illustrate different possible embodiments for the ED 110, AP 170, ANQP server 140, privacy policy server 144, AAA server 148 or gateway 180, and are not intended to be limiting.

As shown in FIG. 2, an example apparatus (e.g., an example embodiment of the ED 110, AP 170, ANQP server 140, privacy policy server 144, AAA server 148 or gateway 180) includes at least one processing unit 201. The processing unit 201 implements various processing operations of the apparatus. For example, the processing unit 201 could perform signal coding, data processing, power control, input/output processing, or any other functionality of the apparatus. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The apparatus (e.g., the ED 110, AP 170, ANQP server 140, privacy policy server 144, AAA server 148 or gateway 180) also includes at least one communication interface 202 for wired and/or wireless communications. Each communication interface 202 includes any suitable structure for generating signals for wireless or wired transmission and/or processing signals received wirelessly or by wire. The apparatus in this example includes at least one antenna 204 (in other examples, the antenna 204 may be omitted). Each antenna 204 includes any suitable structure for transmitting and/or receiving wireless or wired signals. One or multiple communication interfaces 202 could be used in the apparatus. One or multiple antennas 204 could be used in the apparatus. In some examples, one or more antennas 204 may be an antenna array 204, which may be used to perform beamforming and beam steering operations. Although shown as a single functional unit, the apparatus could also be implemented using at least one transmitter interface and at least one separate receiver interface.

The apparatus (e.g., the ED 110, AP 170, ANQP server 140, privacy policy server 144, AAA server 148 or gateway 180) further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the apparatus (e.g., the ED 110, AP 170, ANQP server 140, privacy policy server 144, AAA server 148 or gateway 180) includes at least one memory 208. The memory 208 stores instructions and data used, generated, or collected by the apparatus. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, another example apparatus (e.g., another example embodiment of the ED 110, AP 170, ANQP server 140, privacy policy server 144, AAA server 148 or gateway 180) includes at least one processing unit 250, at least one transmitter 252, at least one receiver 254, one or more antennas 256, at least one memory 258, and one or more input/output devices or interfaces 266. The processing unit 250 implements various processing operations of the apparatus, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the apparatus. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

As previously mentioned, privacy regulations require that an operator communicate its privacy policy to a user's device. In particular, at the time that an ED 110 connects to a LAN 120 (via an AP 170 within the LAN 120), the privacy policy at the LAN 120 should be communicated to the ED 110, particularly where the privacy policy relates to use of the user's data for a commercial purpose. For example, the LAN 120 may collect information (e.g., information about the geographical location of the ED 110, information about the user's online activity, information about the user's identity and interests, etc.) stored on or generated by the ED 110 during the time that the ED 110 is connected to the LAN 120. Such information may be collected for commercial use, for example, which may be strictly regulated. It may be necessary for user provide consent, via the ED 110, to collection of the user's data, before the connection to the LAN 120 can be established.

The present disclosure describes examples that enable the AP 170 of the LAN 120 to provide the privacy policy of the LAN 120 to the ED 110, using ANQP elements. It should be understood that the privacy policy of the LAN 120 is also the privacy policy of the AP 170. ANQP is a protocol that enables the AP 170 to deliver information about network services at the LAN 120 (provided via the AP 170) to an ED 110 that enters the coverage area of the AP 170. Information about the network services available to the ED 110 via the AP 170 is stored at the ANQP server 140. In the present disclosure, information about the privacy policy at the AP 170 may be stored at the ANQP server 140. ANQP involves the use of Generic Advertisement Service (GAS) request/response frames and ANQP query/response elements to request and deliver information between the ANQP server 140, the AP 170 and the ED 110. The ANQP elements are transported within the GAS request/response frames over the air interface. In particular, in the present disclosure, ANQP enables privacy policy to be communicated between the ANQP server 140, the AP 170 and the ED 110.

Figure 4:
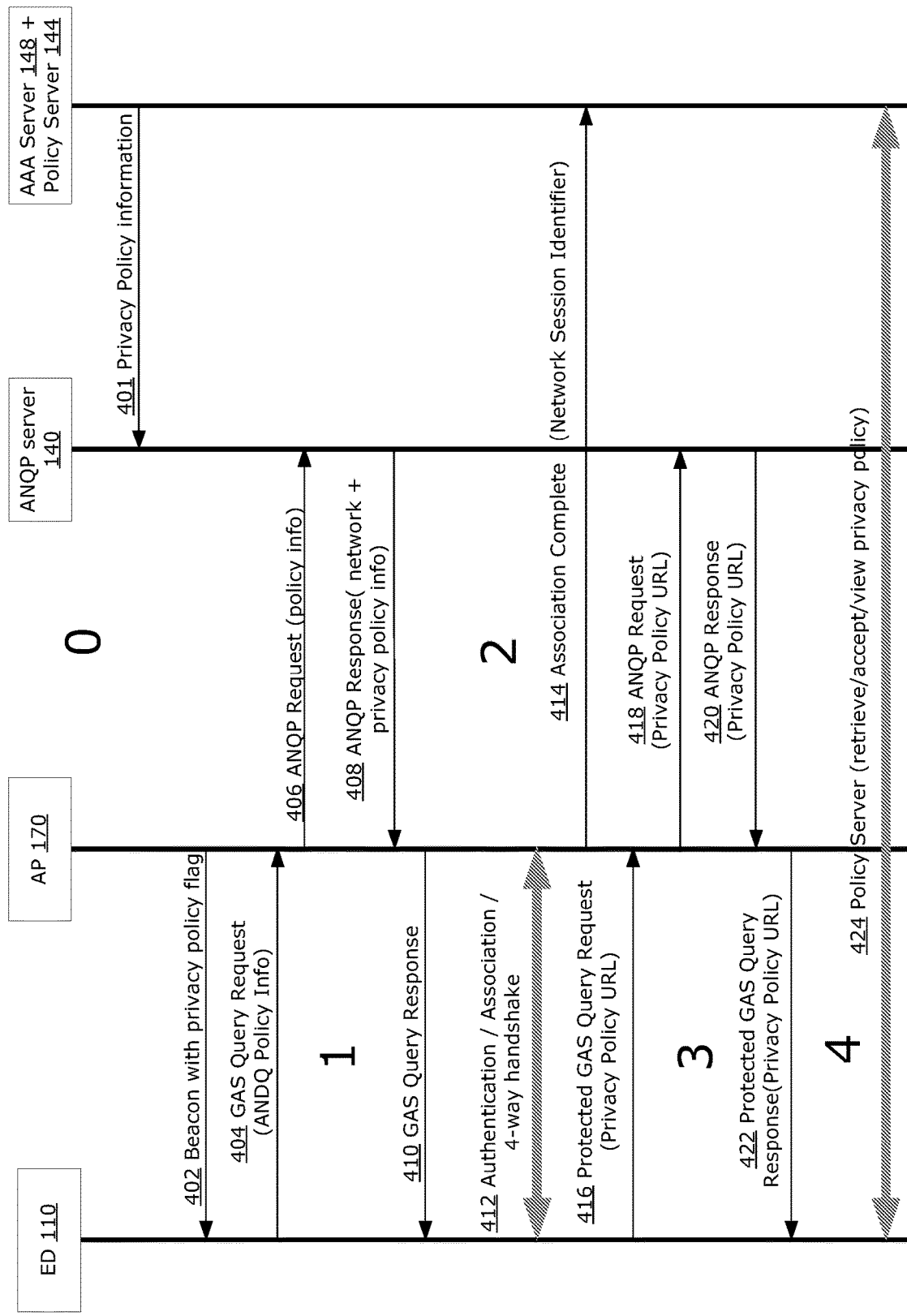
FIG. 4 is a signaling diagram illustrating example signaling between an electronic device (ED), an access point (AP), an ANQP server, a AAA server and a policy server for implementing methods described herein.

FIG. 4 is an example signal flow diagram by the ED 110, the AP 170, the ANQP server 140, the AAA server 148, and the privacy policy server 144. The ANQP server 140 may, in some examples, be inside any other network server storing information associated with the AP's network. For example, the ANQP server 140 may be any suitable server or network entity belonging to the access network 130. In some examples, one or more of the signals shown may be communicated via one or more relay nodes. The following discussion focuses on details relevant to communication of a privacy policy. However, the signaling shown in FIG. 4 may also be used to communicate other information that is regularly communicated using ANQP (e.g., information about network services).

The signaling illustrated in FIG. 4 can be thought of as being divided into a number of stages. At Stage 0, the access network is being provisioned for privacy policy. For example, at step 401, the privacy policy server 144 sends privacy policy information to the ANQP server 140. This enables the ANQP server 140 to provide that privacy policy information to EDs 110 as will be described below. The policy information provided by the privacy policy server 144 may include regional information, a policy URL and a policy acknowledgement requirement which will all be described below with reference to FIG. 5.

Stage 1 may begin when the ED 110 first enters the coverage area of the AP 170. In some example embodiments, at step 402 the AP 170 broadcasts a beacon frame to advertise its network information, which may include a privacy policy capability flag. The beacon frame is received by the ED 110 when the ED 110 enters the coverage area of the AP 170. In other example embodiments (not shown), the AP 170 responds to a probe request frame from the ED 110 with a probe response frame including the privacy policy capability flag. So, while FIG. 4 shows, at step 402, a beacon frame with privacy policy flag, the method applies to probe response frames as well. Once the ED 110 determines, by examining the privacy policy capability flag, that the network supports a privacy policy the ED 110 may perform further signaling to obtain more information about the privacy policy supported by the network.

In some embodiments, the beacon frame (or probe response frame) may also include a Robust Security Network (RSN) information element (IE) or an Opportunistic Wireless Encryption (OWE) IE indicating which type of security is supported on the AP 170. If the network is an open one with no security, this is also indicated in the beacon frame. As discussed earlier, the privacy policy capability flag may be a single flag indicating whether privacy policy capability is supported on the network accessible via the AP 170. Additionally, the privacy policy capability flag may be accompanied by meta-data as indicated above. The privacy policy capability flag and the meta-data may be included in an IE within the beacon frame or within the probe response frame. The ED 110 may be configured beforehand (e.g., according to a standard) to recognize the privacy policy capability flag and meta-data in the beacon frame or probe response frame.

Figure 5:
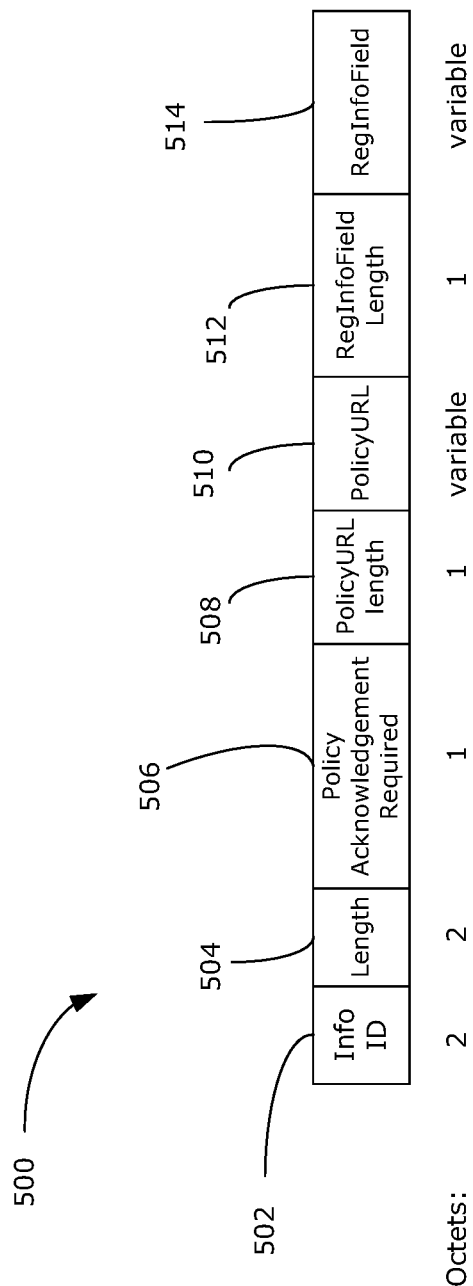
FIG. 5 illustrates an example of an ANQP Response element containing privacy policy related information for use in implementing examples described herein.
Figure 6:
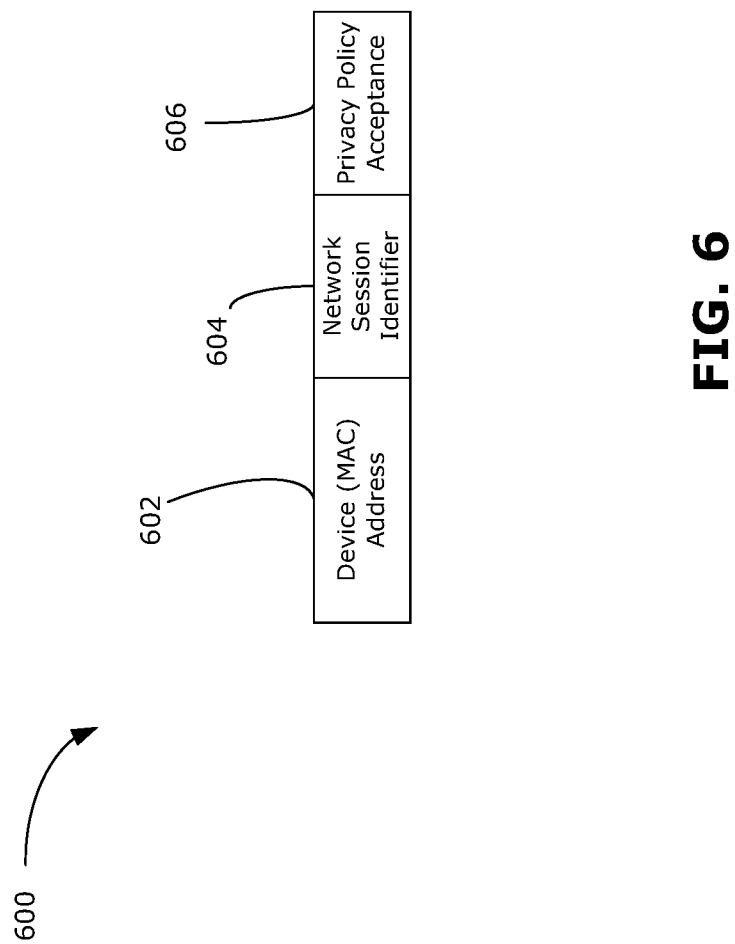
FIG. 6 illustrates an example of a device privacy state tuple for use in implementing examples described herein.

In the depicted embodiment of FIG. 4, the beacon frame received at step 402 indicates that the network supports a privacy policy, but contains no other information (e.g. meta-data) about the privacy policy. In this case, the ED 110 performs further signaling to obtain more information about the privacy policy of the network. At step 404, the ED 110 transmits a GAS Query Request frame to the AP 170. The GAS Query Request frame transports an ANQP Request element to request privacy policy information (and possibly other network information, such as accessible network services) supported by the network. At step 406, upon receiving the GAS Query Request frame, the AP 170 forwards the ANQP Request element to the ANQP server 140. The ANQP Request element requests that the ANQP server 140 provide information about the privacy policy (and possibly other information about network services) to the AP 170. The GAS Query Request frame and the ANQP Request element may be in accordance with the frame formats defined by the IEEE 802.11-2020 standard. At step 408, in response to the ANQP Request element, the ANQP server 140 transmits an ANQP Response element back to the AP 170. The ANQP Response element contains privacy policy information, and possibly other network information. For example, after receiving the ANQP Request element from the AP 170 (step 406), the ANQP server 140 may retrieve a privacy policy stored at the ANQP server 140 that is associated with the AP 170 (e.g. by identifying the AP 170 using information contained in the ANQP Request element and retrieving the information associated with the identified AP 170 from a memory of the ANQP server 140). At 410, after receiving the ANQP Response element, the AP 170 places the ANQP Response element into a GAS Query Response frame. The AP 170 transmits the GAS Query response frame back to the ED 110 to provide privacy policy information. The AP 170 may multicast the GAS Query response frame to multiple EDs 110, for example using a group address to address the GAS Query response frame. The ANQP response element, transported by the GAS Query response frame, sent at step 410 may have a format such as shown in FIG. 5. The ANQP response element 500 format is described below. For steps 408 and 410, the regional information field (RegInfoField 512) and its length (RegInfoField Length) are populated and provided to the ED 110 in the ANQP Response element. The RegInfoField 512 may indicate the privacy law governing access to the network, such as GDPR. The ED 110 evaluates the regional information field values and decides whether to attempt to associate and authenticate with the network, as described in Stage 2 below.

In some embodiments, the remaining fields of the ANQP Response element 500 are not populated at this point. This is because the ED 110 has not yet associated or authenticated with the network and is therefore unable to acknowledge acceptance of a policy or to access a policy URL. In this case, the ED 110 queries the ANQP server again for the policy acknowledgement requirement and the policy URL after associated and authentication, as described below with reference to Stage 3.

In other embodiments, the Policy Acknowledgement Required field 506, the PolicyURL field 510 and the PolicyURL length field 508 are populated in steps 408 and 410. In one example embodiment, the ED 110 extracts and caches that information for use after the ED 110 has associated and authenticated so that the ED 110 may be able to access the privacy policy server 144 via the policy URL provided in the PolicyURL field 510. In this case, the steps of Stage 3 described below may be skipped.

In another example embodiment, the ED uses the policy URL provided in the PolicyURL field 510 to access a publicly accessible privacy policy server over another network. For example, on a dual-mode ED 110 containing both an 802.11 radio and a cellular radio, the ED 110 may access the publicly accessible privacy policy sever through its cellular network connection. Accordingly, the ED 110 is able to access the privacy policy server pertaining to the 802.11 network before it associates and authenticates with the 802.11 network. In general, an electronic device may access the privacy policy sever pertaining to a first network type via a privacy policy URL that is accessible via a second network type. The electronic device may accept the privacy policy of the first network by communicating the acceptance of the privacy policy on the second network. In this case, there is a need for a unique identifier that ties the acceptance of the policy provided on the second network to the electronic device on the first network. In one example embodiment the ED 110 generates a globally unique identifier (GUID) and provides it to the first network (e.g. an 802.11 network) during association or authentication. The GUID may be stored, for example, at the AAA server 148 and associated with the device address of the ED 110. Upon the ED 110 acceptaning the first network's privacy policy by communicating the acceptance to the publicly accessible privacy policy server though the second (e.g. cellular network), the publicly accessible policy server communicates the acceptance and the GUID to the first network. Accordingly, the first network updates the status of the ED 110 as one which has accepted its privacy policy, by matching the GUID stored therein with that received along with the acceptance from the publicly accessible policy server.

The Policy Acknowledgement Required field 506 indicates that the user needs to actively acknowledge the privacy policy in order to gain network access. In some embodiments, the publicly accessible privacy policy server may display a web page including a user interface for accepting or rejecting the network's privacy policy. The user of the ED 110 may accept the privacy policy at Stage 1 by interacting with the publicly accessible privacy policy web page over the other (e.g. cellular) network.

In yet other embodiments, the Policy Acknowledgement Required field 506, the PolicyURL field 510, and the PolicyURL length field 508 may be provided both in Stage 1 and in Stage 3. In this case, the ED 110 may take note of that information, as provided in Stage 1, but treat the information provided in Stage 3 as more authoritative since they are sent after the device has been authenticated.

With reference to FIG. 5, the ANQP Response element 500 is shown. The ANQP Response element 500 comprises a plurality of fields. The Info ID 502 and length 504 are WLAN protocol elements defined in the IEEE 802.11-2020 standard. The Policy Acknowledgement Required field 506 indicates that the STA (i.e. ED 110) needs to acknowledge the privacy policy to gain network access. The PolicyURL field 510 is a variable length field containing a URL that points to a privacy policy server which may include a web page containing privacy policy information pertaining to the network. Since the PolicyURL 510 has a variable length, a PolicyURL length field 508 specifies the length thereof. The RegInfoField 514 is an optional field to indicate the privacy law governing access to the network, such as GDPR. The RegInfoField 512 is the length of the RegInfoField 514.

Turning back to FIG. 4, stage 2 begins at step 412. At step 412 and based in part on the privacy policy retrieved from the ANQP server 140, the ED 110 selects, associates and authenticates with the network of the AP 170. For example, if the ED 110 had evaluated the privacy policy for the network and is in agreement therewith, then the ED 110 proceeds with requesting association and authentication. Conversely, if the ED 110 had evaluated the privacy policy for the network and determined that there is insufficient compliance with its privacy requirements, then the ED 110 does not proceed with association and authentication with the network. In the latter case, the ED 110 may scan for other networks which may comply with its predetermined level of privacy, and evaluates a new beacon as in step 402. As part of step 412, the ED 110 and AP 170 mutually derive a Network Session Identifier (NSI).

In a network having RSN (Robust Security Network) capability, the NSI can be a Pairwise Master Key (PMK) derived in a 4-way EAPOL handshake from a shared key, the device (MAC) address of the ED 110 and the device (MAC) address of the AP 170, as specified in the 802.1X standard. Upon successful completion of both the authentication and association of the ED 110 with the AP 170, at step 414 the AP 170 sends the NSI (which is a PMK) to the AAA server 148.

In a network where there is no security or in a network utilizing Opportunistic Wireless Encryption (OWE), the NSI may be a globally unique identifier (GUID). A GUID is either generated by the ED 110 and transmitted to the AP 170 or generated by the AP 170 and transmitted to the ED 110. In such example, the AP 170 sends the NSI (which is a GUID) and the device (MAC) address of ED 110 to the AAA server 148 to record the authorization. The step 414 is labelled "Association Complete" in FIG. 4. It signifies that the ED 110 has associated with the network and provided both its hardware address and the NSI to the AAA server 148. If the network was a secure network, then the ED 110 has also authenticated as part of step 412 and before step 414. The AAA server 148 stores the device address (e.g. MAC address) of the ED 110 and the corresponding NSI representing the connection between the ED 110 and the AP 170.

Stage 3 begins after successful association and authentication (if applicable). At step 416, the ED 110 sends an ANQP Request transported by a protected GAS Query request to the AP 170. The GAS Query request may be encrypted using the security keys established during authentication. At step 418, the ANQP Request is forwarded from the AP 170 to the ANQP server 140 as an ANQP Request for the privacy policy URL. At step 420, the ANQP server 140 responds to the ANQP Request with an ANQP Response element 500 to the AP 170. The ANQP Response 500 contain the privacy policy URL in the PolicyURL field 510. At step 422, the AP 170 forwards the ANQP Response element 500 in a protected GAS Query response, to the ED 110. As mentioned above, the ANQP Response element 500 contains a number of fields which have been described with reference to FIG. 5. The response provided at step 422 may have all the fields populated including the Policy Acknowledgement Required field 506, the PolicyURL length field 508 and the PolicyURL field 510.

In some embodiments, the privacy policy URL provided in step 422 to the ED 110 is be a combination of venue information (i.e. an ANQP Venue URL element) as well as the privacy policy. The privacy policy URL allows the ED 110 to connect to the privacy policy server 144 on the network as shown in detail in FIG. 7. However, at this point, the ED 110 does not yet have full access to the network, including for example internet 150. The gateway 180 prevents access to the internet 150 until the ED 110 has accepted the network's privacy policy.

Figure 7:
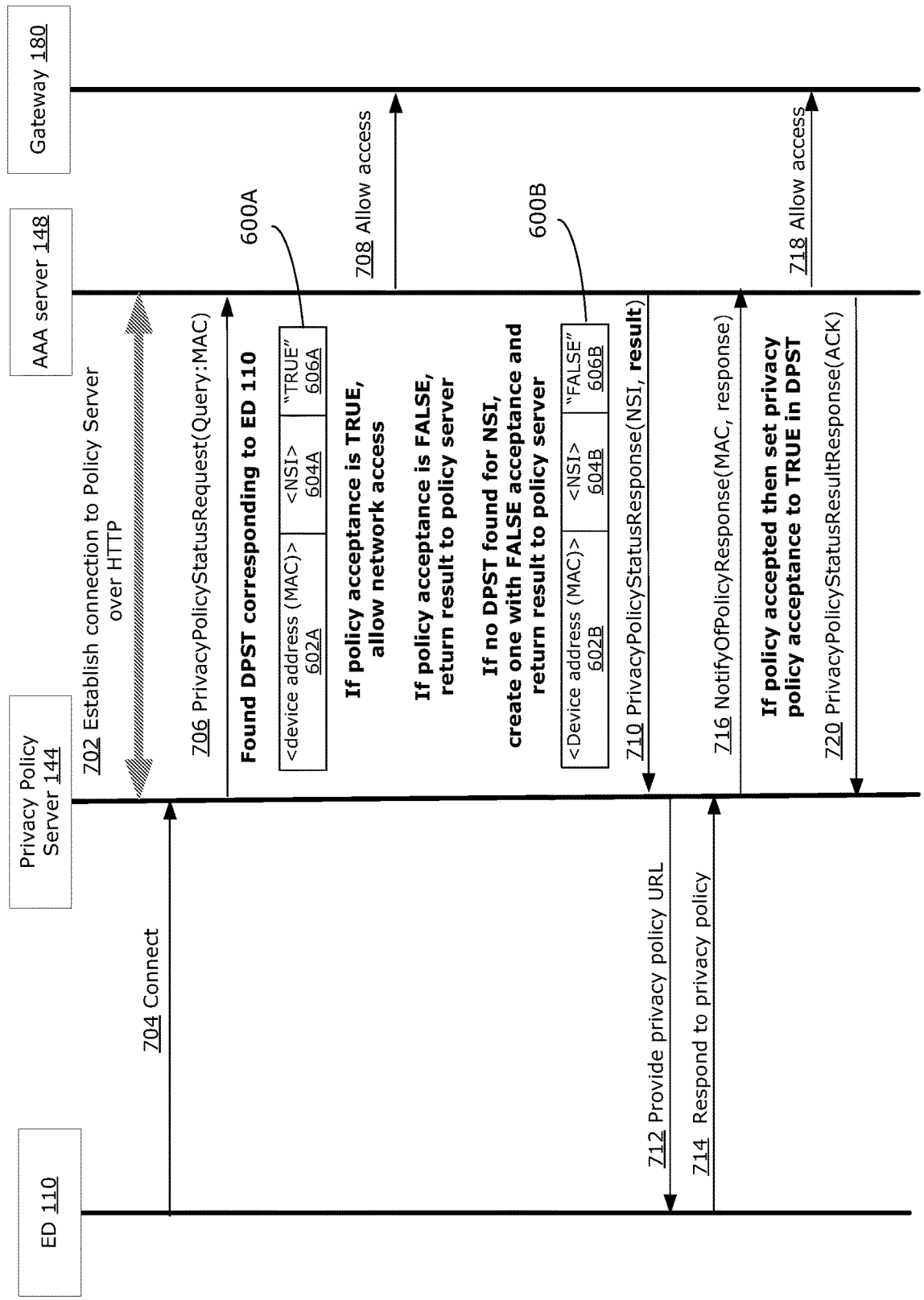
FIG. 7 is a signaling diagram illustrating example signaling between an ED, a privacy policy sever, a AAA server, and a gateway for implementing methods described herein.

Stage 4 is shown as a single step 424 due to the limited space in FIG. 4. FIG. 7 shows the interactions of step 424 in more detail and is described below. For the purpose of FIG. 4, at step 424, the ED 110 accesses the privacy policy server 144 using the privacy policy URL, responds to the privacy policy, and gains access to the full network based on the response to the privacy policy. This is explained further with reference to FIG. 7.

FIG. 7 shows the interactions between the ED 110, the privacy policy server 144 and the AAA server 148 which take place after the ED 110 has successfully associated and authenticated (if applicable) with the network. Initially, at step 702, the privacy policy server 144 and the AAA server 148 establish a connection with one another using a protocol such as Hypertext Transfer Protocol (HTTP). This is an initialization step that could take place before any other messages. This permits the privacy policy server 144 to communicate with the AAA server by transmitting Representational State Transfer (REST) API messages.

At step 704, the ED 110 makes a connection request to connect with the privacy policy server 144 using the policy URL provided thereto in the PolicyURL field 510 of the ANQP Response element 500, as discussed earlier. As a result of the connection, the privacy policy server 144 has the device (e.g. MAC) address of the ED 110. At step 706 the privacy policy server 144, using the device (MAC) address of the ED 110, queries the AAA server 148. The query can be done via a privacy policy status request (PrivacyPolicyStatusRequest) REST API call. The AAA server 148 has maintained an NSI for the device address (in step 414 of FIG. 4). Accordingly, the AAA server 148 retrieves the NSI for the connection between the ED 110 and the AP 170. At this point the AAA server 148 determines whether the ED 110 had previously accepted this network's privacy policy. The AAA server 148 stores a plurality of DPSTs, one for each electronic device that has accepted the network's privacy policy. The AAA server 148 searches the plurality of DPSTs by the NSI it had just retrieved based on the device address of ED 110. If the ED 110 has previously associated with the network and accepted the privacy policy, there will be a DSPT entry for ED 110. If the ED 110 has re-associated with the network using a different device (MAC) address or a random MAC address, it may still be using the same NSI since in accordance with either P802.11bh or P802.11bi, the ED 110 is able to re-use the old NSI (e.g. the old PMK) even though it is using a new (different) MAC address. Advantageously, by using the NSI to locate a DPST corresponding to the ED 110, the AAA server 148 can determine privacy policy acceptance state for an ED 110 even if it reconnects to the network with a different MAC address. Similarly, a device which uses a randomly generated MAC address can reconnect with the network using a new randomly generated MAC address and the AAA server 148 can still identify the device using the NSI and can determine a previously stored privacy policy acceptance state thereof.

The AAA server 148 searches through the DPST 600 entries stored thereon, if any. If there is a DPST 600A containing the NSI corresponding to ED 110 stored at the AAA, the AAA server checks the privacy acceptance field 606A thereof. If the privacy policy acceptance filed 606A contains "TRUE", then the privacy policy of the network had been previously accepted by the ED 110. In this case no further action is required other than to allow the device to access the network including the internet 150. Accordingly, at step 708, the AAA server 148 configures the gateway 180 to allow the ED 110 to access the network, including the internet 150.

If, however, the privacy policy acceptance field 606A of the DPST 600A containing the NSI corresponding to ED 110 is set to "FALSE", that means that the device had previously rejected the network's privacy policy. This is reported back to the privacy policy server 144 at step 710 using the privacy policy status response (PrivacyPolicyStatusResponse) REST API call from the AAA server 148 to the privacy policy server 144. In the privacy policy status response, the "result" field contains the value of the privacy policy acceptance field 606A, which in this case is "FALSE".

If there is no DPST corresponding to the NSI, then the ED 110 has not been presented with the network's privacy policy yet. This could mean that this is the first time the ED 110 connects to the network. The AAA server creates a new DPST entry 600B for the ED 110. The new DPST entry 600B contains the device address of ED 110 in the device address field 602B, the NSI in the NSI field 604B, and the privacy policy acceptance field 606B is set to "FALSE" by default. A step 710, the AAA server 148 now calls the privacy policy status response (PrivacyPolicyStatusResponse) REST API with the result set to "FALSE" as discussed above.

If the result returned by the privacy policy status response to the privacy policy server 144 contains "FALSE", then at step 712, the privacy policy server pushes (or loads) a privacy policy URL to the ED 110. The ED 110 opens the privacy policy URL which, in some example embodiments, points to a privacy policy web page. The privacy policy web page contains at least one user interface element through which the user of the ED 110 may response to the privacy policy either by accepting or rejecting same. At step 714, via interaction with the web page, the privacy policy server 144 receives the user's response to the privacy policy.

At step 716, the privacy policy server 144 notifies the AAA server 148 of the privacy policy response received from the ED 110. This may be done by calling a notification of policy response (NotifyOfPolicyResponse) REST API on the AAA server 148. As before, the AAA server 148 can determine the NSI corresponding to ED 110 from the device (MAC) address thereof which is known via the notification of policy response REST API. The AAA server 148 uses the NSI to locate the DPST corresponding to the ED 110. If the response included with the notification of policy response is "TRUE", then the privacy policy acceptance field 606 of the DPST 600 corresponding to ED 110 is updated to "TRUE".

Additionally, at step 718, the AAA server 148 instructs the gateway 180 to allow the ED 110 to access the network including internet 150. At step 720, a policy status result response REST API may be called to provide an acknowledgement to the privacy policy server 144 that the ED 110 has been allowed access to the network. If the response included with the notification of policy response is "FALSE", then no further action is required as the DPST 600 corresponding to the ED 110 has already been initialized with "FALSE" in the field 606B as indicated above.

Figure 8:
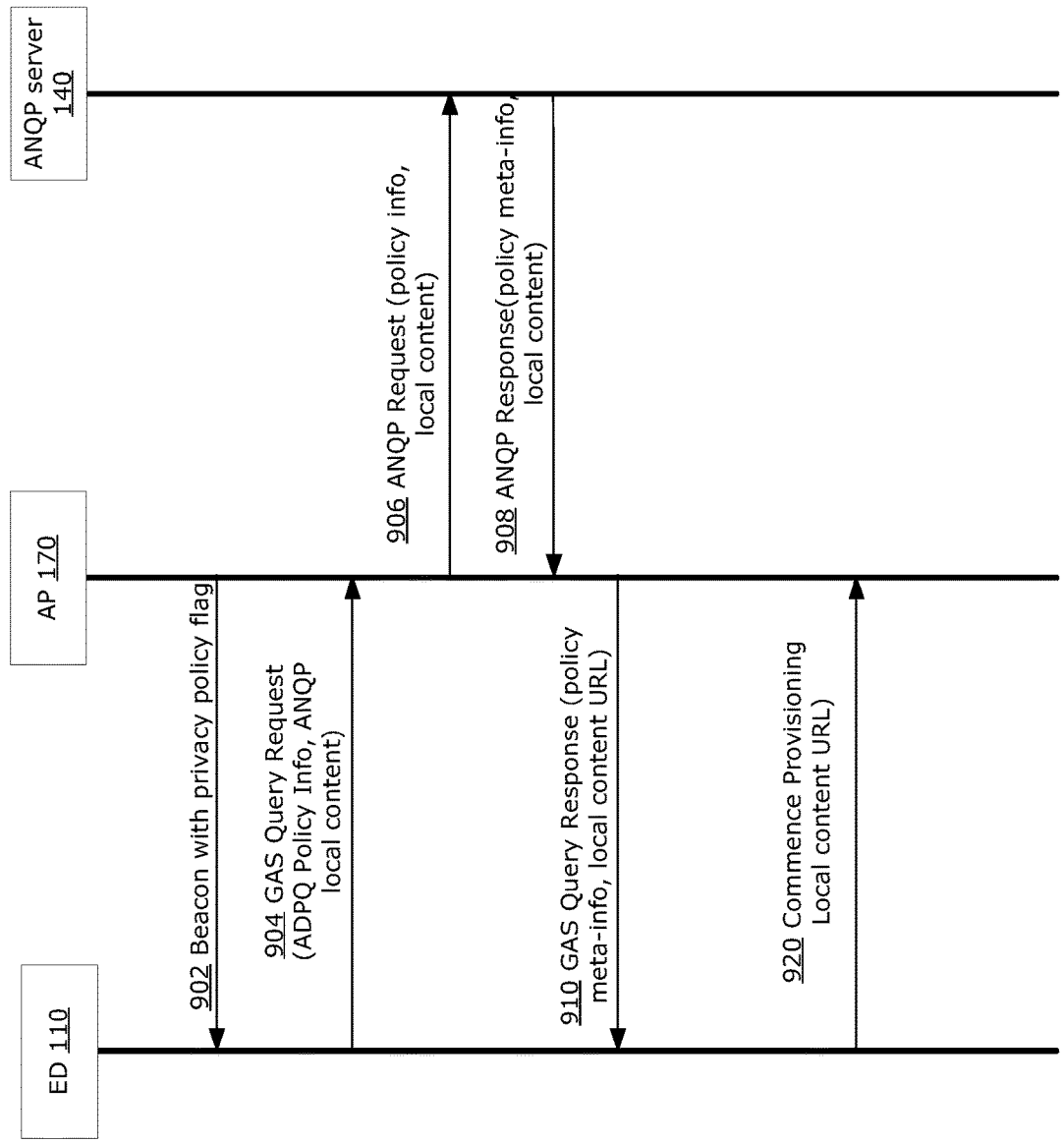
FIG. 8 is a signaling diagram illustrating example signaling for implementing network access control based on privacy policy for an electronic device in an open network.

For unknown networks, where a STA does not have authentication and association credentials, the policy information is contained in the initial ANQP Request and Response elements. With reference to FIG. 8, there is shown a simplified sequence chart for use with an unknown network, such as when arriving at an airport for the first time. At step 902, the beacon received from the AP 170 is examined for a privacy policy capability flag as discussed above. To obtain more information about provisioning and privacy policy information, an ANQP Request element for policy information is sent to the AP 170 at step 904, transported within a GAS Query Request frame. At step 906, the AP 170 sends an ANQP Request for the privacy policy information and for local content, to the ANQP server 140. At step 908, the ANQP server 140 sends the policy information (e.g. meta-data or meta-info) and local content back to the AP 170. At step 910, the AP 170 sends an ANQP Response element containing privacy policy information (e.g. meta-data) and a local content URL, transported within a GAS Query Response frame. At step 920, the ED 110 uses the local content URL to commence provisioning. The local content URL may point to a web page for registering with the network and also for reviewing and accepting the network's privacy policy.

The Device Provisioning Protocol (DPP) provides an architecture which simplifies the establishment of secure connectivity between devices and provides a foundation for improved usability in provisioning and connecting devices. In DPP, a device may be a Configurator or an Enrollee. A Configurator device supports the set-up of Enrollees. After authentication, a Configurator provisions the Enrollee for device-to-device communication or infrastructure communication. Credential information that is provisioned on an Enrollee device is known as a Connector. The Connector is used by a pair of Enrollee devices, such as a STA and an AP, to establish a security association using the Network Introduction Protocol (NIP). Each Enrollee device, such as a STA and an AP, is provisioned with a Connector using the DPP Configuration Protocol. A Connector object contains a plurality of attributes. To support privacy policy, a number of additional attributes are proposed shown in FIGS. 9A and 9B. FIG. 9A shows additional attributes which would be added to the Connector object of an AP for privacy policy support. FIG. 9B shows additional attributes which would be added to the Connector object of a STA for privacy policy support.

Figure 10:
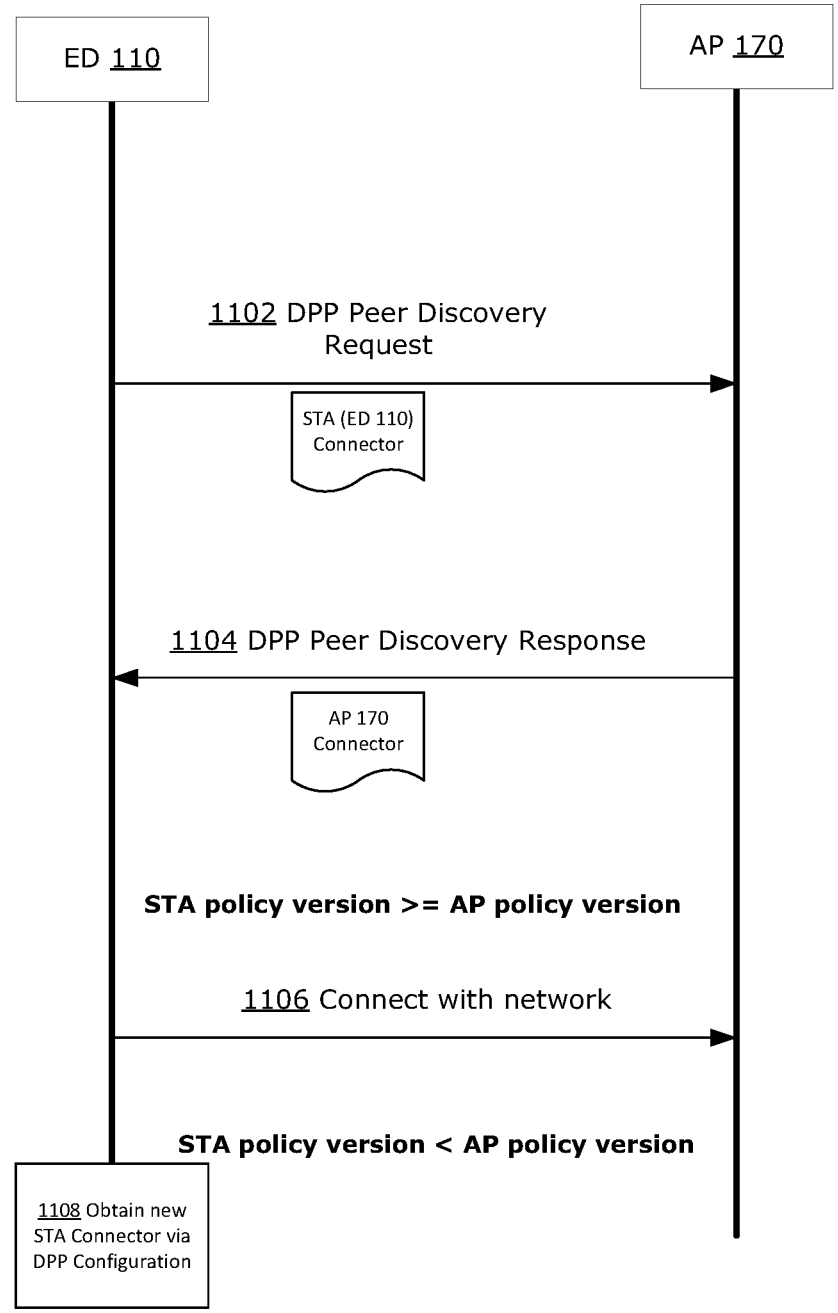
FIG. 10 is a signaling diagram illustrating example signaling for implementing network access control based on privacy policy using the DPP.

FIG. 10 is message sequence diagram showing an interaction between a STA (e.g. ED 110) with an AP 170 using NIP in which the ED 110 compares privacy policy attributes between its Connector and the Connector for the AP 170. Based on the comparison, the STA decides whether to connect to the AP 170 or obtain a new Connector. The interaction starts at step 1102 with the ED 110 sending a DPP peer discovery request frame to the AP 170. The DPP peer discovery request frame contains the STA Connector corresponding to ED 110. The AP 170 performs some validation checks on the STA Connector in accordance with the DPP. For example, with respect to the privacy policy attributes, the AP 170 checks whether PrivacyPolicyAccepted value is "TRUE", that the value of privacyPolicyVersion is in an acceptable value range, and that privacyPolicyDate is in an acceptable date range. If there are no concerns about the STA Connector, then at step 1104, the AP 170 responds to the ED 110 with a DPP peer discovery response frame with the status DPP_STATUS_OK. The DPP peer discovery response frame contains the AP Connector for AP 170. The STA (ED 110) performs some validation checks on the AP Connector. For example, with respect to the privacy policy attributes of the AP Connector, the STA (ED 110) checks whether the privacyRequired attribute is set to "TRUE", that that the value of privacyPolicyVersion is in an acceptable value range, and that privacyPolicyDate is in an acceptable date range. The STA (ED 110) compares the privacy policy attribute in each of the STA Connector and the AP Connector. If the privacy policy version of the STA Connector is greater than or equal to the privacy policy version of the AP Connector, then at step 1106, the STA (ED 110) connects with the AP 170. If, on the other hand, the STA privacy policy version is lower than the privacy policy version of the AP Connector, then at step 1108, the STA (ED 110) obtains a new STA Connector via DPP Configuration.

While many electronic devices, such as ED 110 contain a display and input peripherals such as a keypad or a touchscreen, many IoT devices have limited or no user interfaces. Such devices may utilize the DPP as described above with reference to FIG. 10. Since the acceptance or rejection of the privacy policy using the DPP as outlined in FIG. 10 is based on a comparison of privacy policy version, it is an appropriate method to use for privacy policy management for devices which do not have user interfaces, such as IoT devices.

Figure 11:
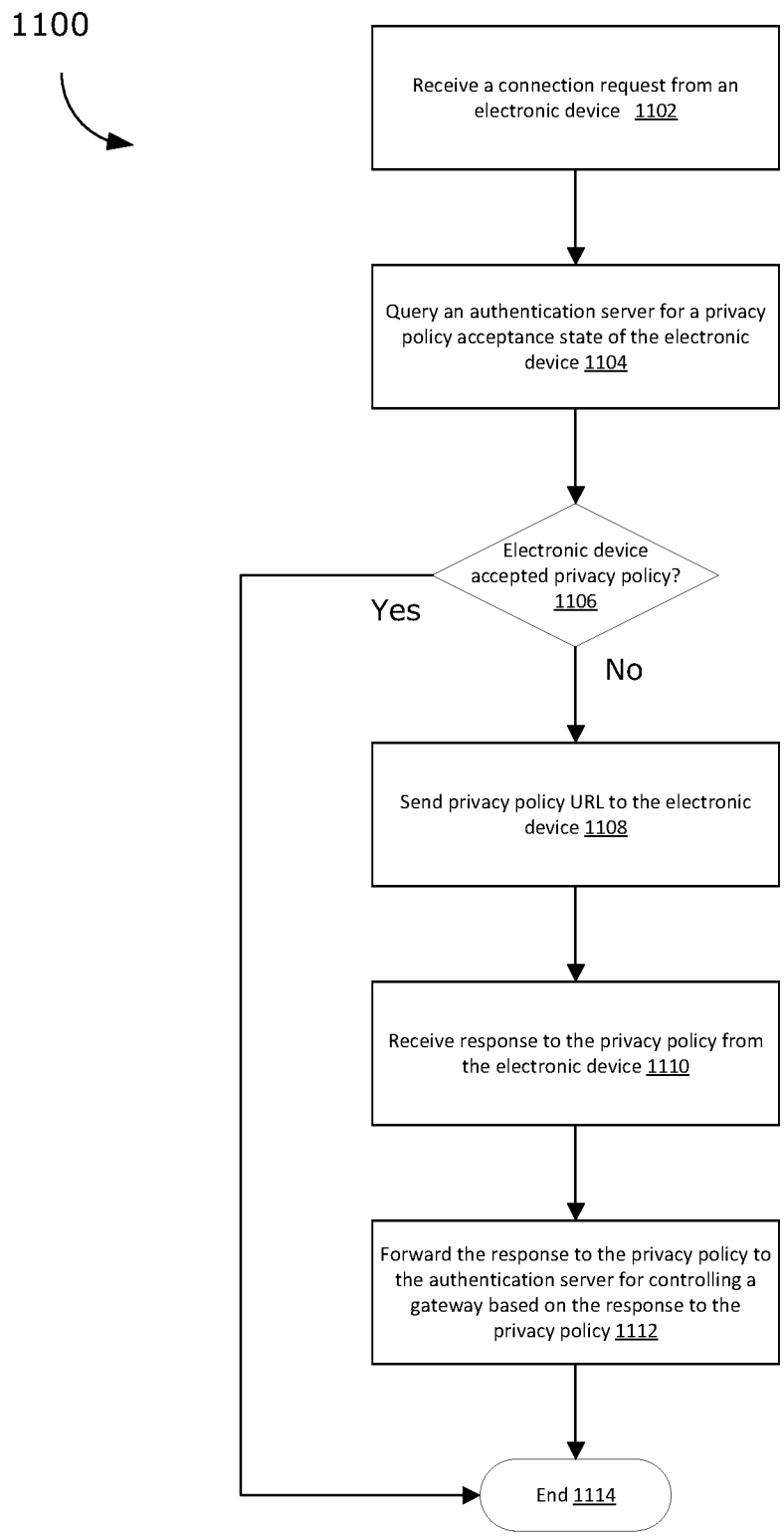
FIG. 11 is a flow chart of a method performed by a privacy policy server, in accordance with embodiments of the present disclosure.

FIG. 11 is a flow chart depicting a method 1100 performed by the privacy policy server 144, which is connected within a network, in accordance with embodiments of the present disclosure. At step 1102, the privacy policy server 144 receives a connection request from an electronic device, such as ED 110. At step 1104, the privacy policy server 144 queries an authentication server, such as the AAA serve 148, for a privacy policy acceptance state of the electronic device. At step 1106, the privacy policy server 144 checks whether the electronic device has accepted the privacy policy of the network. If the electronic device has already accepted the privacy policy of the network, then the method ends at step 1114. If the electronic device has not accepted the privacy policy of the network, control goes to step 1108. At step 1108, the privacy policy server 144 sends a privacy policy universal resource locator (URL) to the electronic device. The privacy policy URL may, for example, point to a web page through which the user of the electronic device may accept the privacy policy of the network. At step 1110, the privacy policy server 144 receives a response to the privacy policy of the network from the electronic device via the privacy policy URL. At step 1112, the privacy policy server 144 forwards the response to the privacy policy to the authentication server so that the authentication server may control a gateway, such as gateway 180, based on the response.

Figure 12:
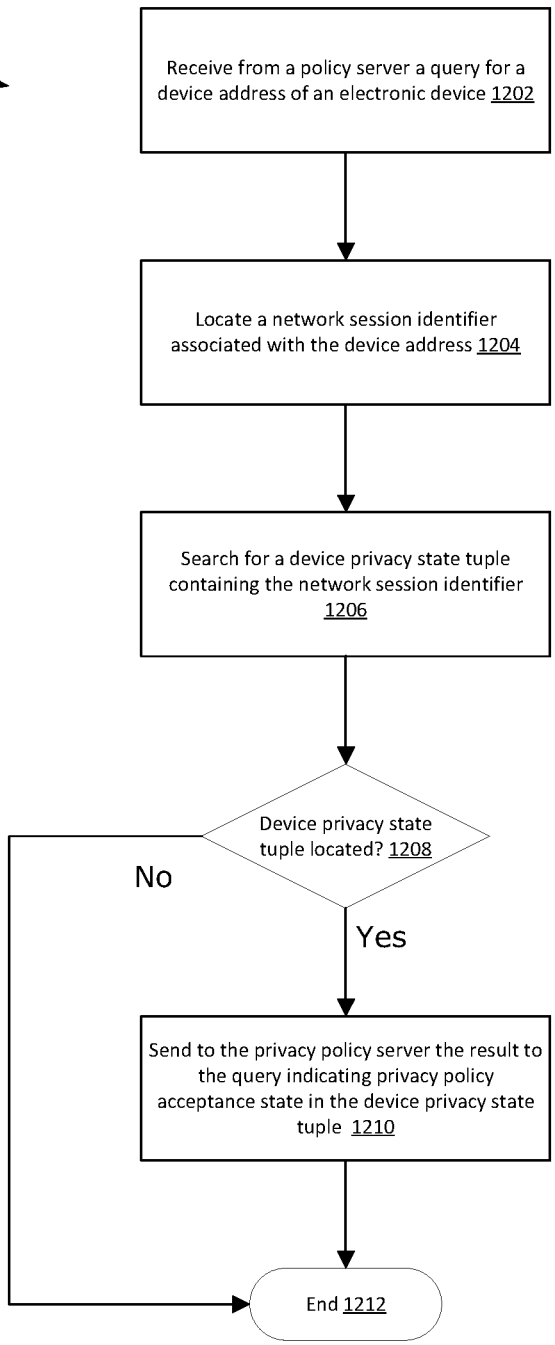
FIG. 12 is a flow chart of a method performed by an authentication server, in accordance with embodiments of the present disclosure.

FIG. 12 is a flow chart depicting a method 1200 performed by the authentication server, such as the AAA server 148, which is connected within a network, in accordance with embodiments of the present disclosure. At step 1202, the authentication server receives, from a policy server, a query for a device address for an electronic device. At step 1204, the authentication server locates a network session identifier associated with the device address. At step 1206, the authentication server searches for a device privacy state tuple containing the network session identifier. At step 1208, if the authentication server finds a device privacy state tuple containing the network session identifier, then control goes to step 1210. At step 1210, the authentication server sends to the privacy policy server a result to the query (from step 1202 above). The result indicating the privacy policy acceptance state which is in the found device privacy state tuple.

Certain adaptations and modifications of the described embodiments can be made. Therefore, the above discussed embodiments are considered to be illustrative and not restrictive.

The invention claimed is:

1. A method at an authentication server connected within a network, the method comprising:
   receiving, from a privacy policy server, a query for a device address of an electronic device;
   locating a network session identifier associated with the device address;
   searching for a device privacy state tuple containing the network session identifier, with effect that the device privacy state tuple containing the network session identifier is either located or not located;
   in response to locating the device privacy state tuple containing the network session identifier, sending, to the privacy policy server, a result to the query, the result indicating a privacy policy acceptance state in the device privacy state tuple; and
   in response to not locating the device privacy state tuple containing the network session identifier, creating another device privacy state tuple containing the device address, the network session identifier and a value for the privacy policy acceptance state indicating that the electronic device has not accepted a privacy policy of the network.

2. The method of claim 1, further comprising in response to determining that the privacy policy acceptance state indicates acceptance of a privacy policy of the network, configuring a gateway to allow the electronic device to have full access to the network.

3. The method of claim 1, further comprising receiving, from the privacy policy server, a privacy policy response indicating acceptance or rejection of a privacy policy of the network by the electronic device.

4. The method of claim 3, further comprising in response to determining that the privacy policy response indicates an acceptance of the privacy policy of the network by the electronic device, configuring a gateway to allow the electronic device to have full access to the network.

5. The method of claim 4, further comprising sending a privacy policy state acknowledgement to the privacy policy server.

6. A non-transitory computer-readable medium storing instructions that when executed by the processing unit of an authentication server, cause the authentication server to:
   receive, from a privacy policy server, a query for a device address of an electronic device;
   locate a network session identifier associated with the device address;
   search for a device privacy state tuple containing the network session identifier, with effect that the device privacy state tuple containing the network session identifier is either located or not located;
   in response to locating the device privacy state tuple containing the network session identifier, send, to the privacy policy server, a result to the query, the result indicating a privacy policy acceptance state in the device privacy state tuple; and
   in response to not locating the device privacy state tuple containing the network session identifier, create another device privacy state tuple containing the device address, the network session identifier and a value for the privacy policy acceptance state indicating that the electronic device has not accepted a privacy policy of the network.

7. The non-transitory computer-readable medium of claim 6, wherein the instructions further cause the authentication server to in response to determining that the privacy policy acceptance state indicates acceptance of a privacy policy of the network, configure a gateway to allow the electronic device to have full access to the network.

8. The non-transitory computer-readable medium of claim 6, wherein the instructions further cause the authentication server to receive, from the privacy policy server, a privacy policy response indicating acceptance or rejection of a privacy policy of the network by the electronic device.

9. The non-transitory computer-readable medium of claim 8, wherein the instructions further cause the authentication server to in response to determining that the privacy policy response indicates an acceptance of the privacy policy of the network by the electronic device, configure a gateway to allow the electronic device to have full access to the network.

10. The non-transitory computer-readable medium of claim 9, wherein the instructions further cause the authentication server to send a privacy policy state acknowledgement to the privacy policy server.

11. An authentication server comprising:
   a processing unit coupled to a memory, the memory storing instructions that, when executed by the processing unit, cause the authentication server to:
   receive, from a privacy policy server, a query for a device address of an electronic device;
   locate a network session identifier associated with the device address;
   search for a device privacy state tuple containing the network session identifier, with effect that the device privacy state tuple containing the network session identifier is either located or not located;
   in response to locating the device privacy state tuple containing the network session identifier, send, to the privacy policy server, a result to the query, the result indicating a privacy policy acceptance state in the device privacy state tuple; and
   in response to not locating the device privacy state tuple containing the network session identifier, create another device privacy state tuple containing the device address, the network session identifier and a value for the privacy policy acceptance state indicating that the electronic device has not accepted a privacy policy of the network.

12. The authentication server of claim 11, wherein the instructions further cause the authentication server to in response to determining that the privacy policy acceptance state indicates acceptance of a privacy policy of the network, configure a gateway to allow the electronic device to have full access to the network.

13. The authentication server of claim 11, wherein the instructions further cause the authentication server to receive, from the privacy policy server, a privacy policy response indicating acceptance or rejection of a privacy policy of the network by the electronic device.

14. The authentication server of claim 13, wherein the instructions further cause the authentication server to in response to determining that the privacy policy response indicates an acceptance of the privacy policy of the network by the electronic device, configure a gateway to allow the electronic device to have full access to the network.

15. The authentication server of claim 14, wherein the instructions further cause the authentication server to send a privacy policy state acknowledgement to the privacy policy server.

\* \* \* \* \*